Figure 1:
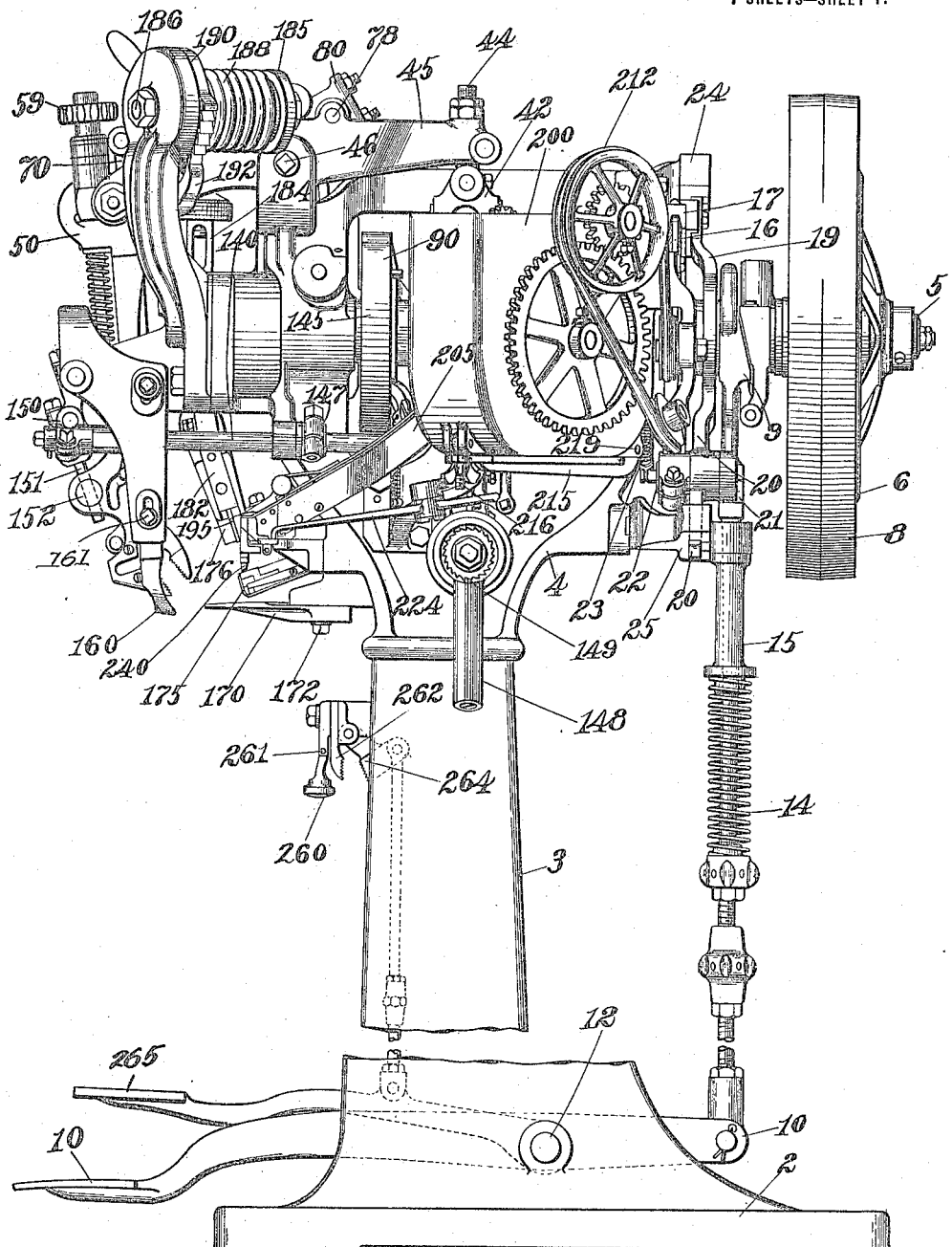

T. H. SEELY.
LASTING MACHINE.
APPLICATION FILED AUG. 31, 1912.

1,194,431.

Patented Aug. 15, 1916.
7 SHEETS—SHEET 1.

T. H. SEELY.
LASTING MACHINE.
APPLICATION FILED AUG. 31, 1912.

1,194,431.

Patented Aug. 15, 1916.

T. H. SEELY.
LASTING MACHINE.
APPLICATION FILED AUG. 31, 1912.
1,194,431.
Patented Aug. 15, 1916.
7 SHEETS—SHEET 6.
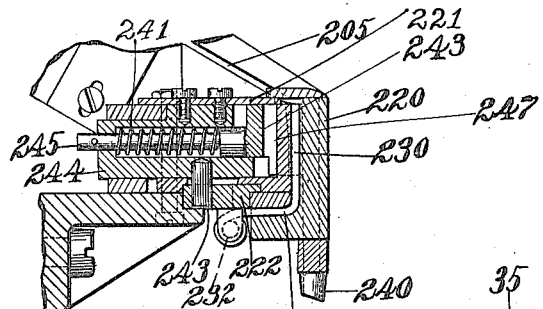
Fig. 6.
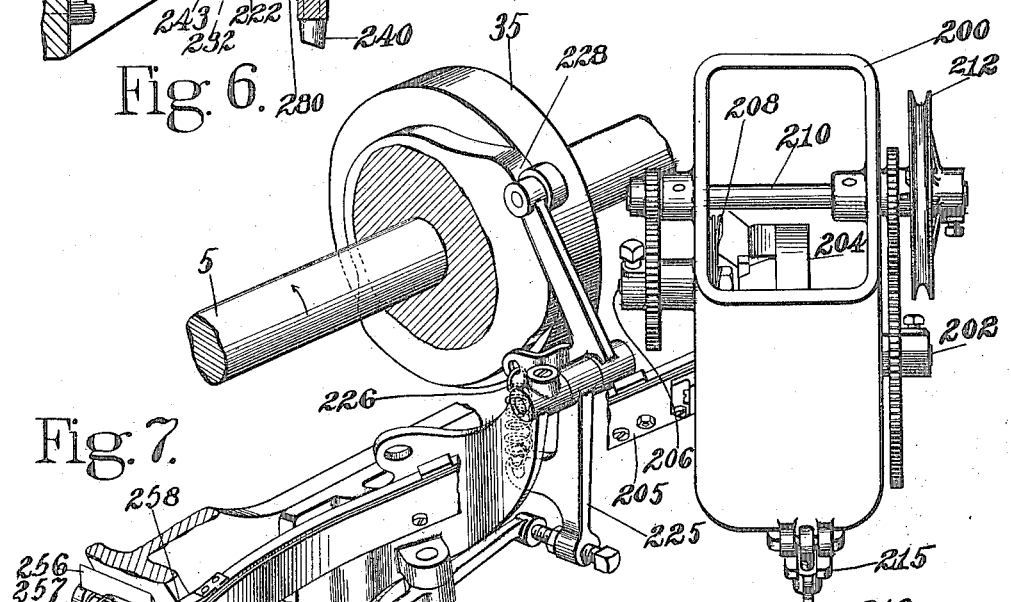
Fig. 7.
Fig. 8.
WITNESSES.
O. Blanche Hargraves
Edith C. Holbrook
INVENTOR
Thomas H. Seely
By his Attorney
Nelson W. Howard T. H. SEELY.
LASTING MACHINE.
APPLICATION FILED AUG. 31, 1912.
1,194,431.
Patented Aug. 15, 1916.
7 SHEETS—SHEET 7.
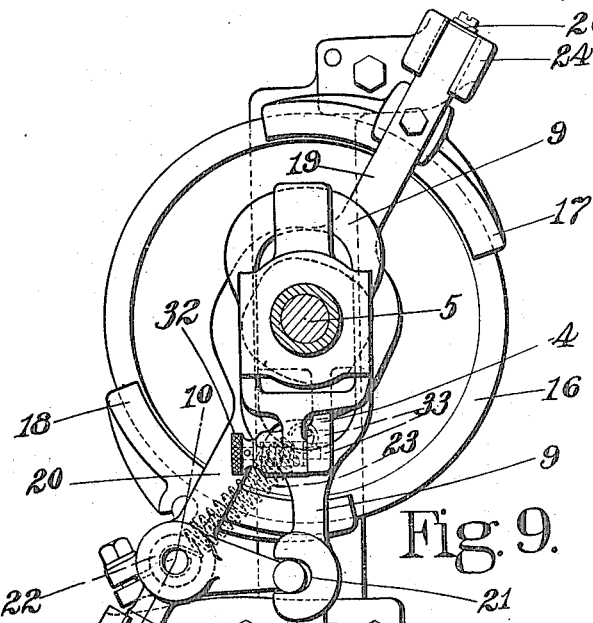
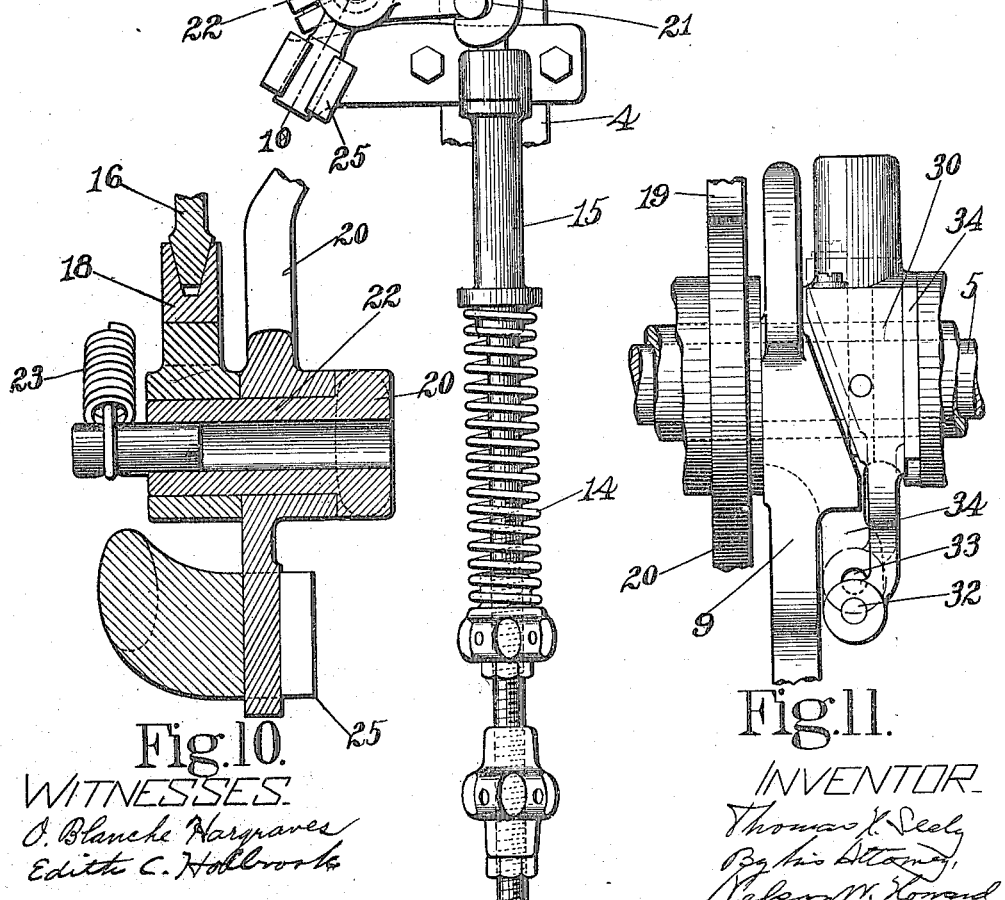
WITNESSES.
O. Blanche Hargraves
Edith C. Holbrook
INVENTOR.
Thomas H. Seely
By his Attorney,
Nelson W. Howard

UNITED STATES PATENT OFFICE.

THOMAS H. SEELY, OF DORCHESTER, MASSACHUSETTS, ASSIGNOR TO UNITED SHOE MACHINERY COMPANY, OF PATERSON, NEW JERSEY, A CORPORATION OF NEW JERSEY.

LASTING-MACHINE.

1,194,431. Specification of Letters Patent. Patented Aug. 15, 1916.

Application filed August 31, 1912. Serial No. 718,031.

*To all whom it may concern:*

Be it known that I, THOMAS H. SEELY, a citizen of the United States, residing at Dorchester, in the county of Suffolk and State of Massachusetts, have invented certain Improvements in Lasting-Machines, of which the following description, in connection with the accompanying drawings, is a specification, like reference characters on the drawings indicating like parts in the several figures.

This invention relates to machines for lasting boots and shoes, and is herein shown and described as embodied by way of exemplification in a machine of the general type shown and described in my prior Patent No. 945,291, granted January 4, 1910, and the general object of the invention is to improve and simplify lasting machinery of this type.

One of the features of the invention consists in a novel organization of the gripper operating mechanism, and another feature relates to a novel construction of the gripper itself.

A further feature of the invention is found in the shoe bottom rest which is constructed and arranged to permit the gripper to operate through the rest in its operative movements. As shown in the drawings the rest has provision for adjustment angularly to position the shoe engaging portion toward and from the body of the machine.

Another of the features of the invention consists in providing a mechanism which drives two tacks with a rest having a broad foot bearing upon the shoe bottom to level the shoe and insure that the two tacks shall be driven to the same extent.

Another feature of the invention consists in the combination of lasting mechanism with a tacker block which is brought to a position remote from the shoe to receive tacks and then is swung through an arc inclined downwardly and inwardly across the edge of the shoe to a position in which the tack is properly located to be driven into the shoe. In the illustrated embodiment of the invention the tack block is made to deliver a slanting or inclined blow or wipe of increasing intensity as it advances over the shoe bottom to tack inserting position.

These and other features will appear from the following description when read in connection with the accompanying drawing and will be pointed out in the appended claims.

Figure 2:
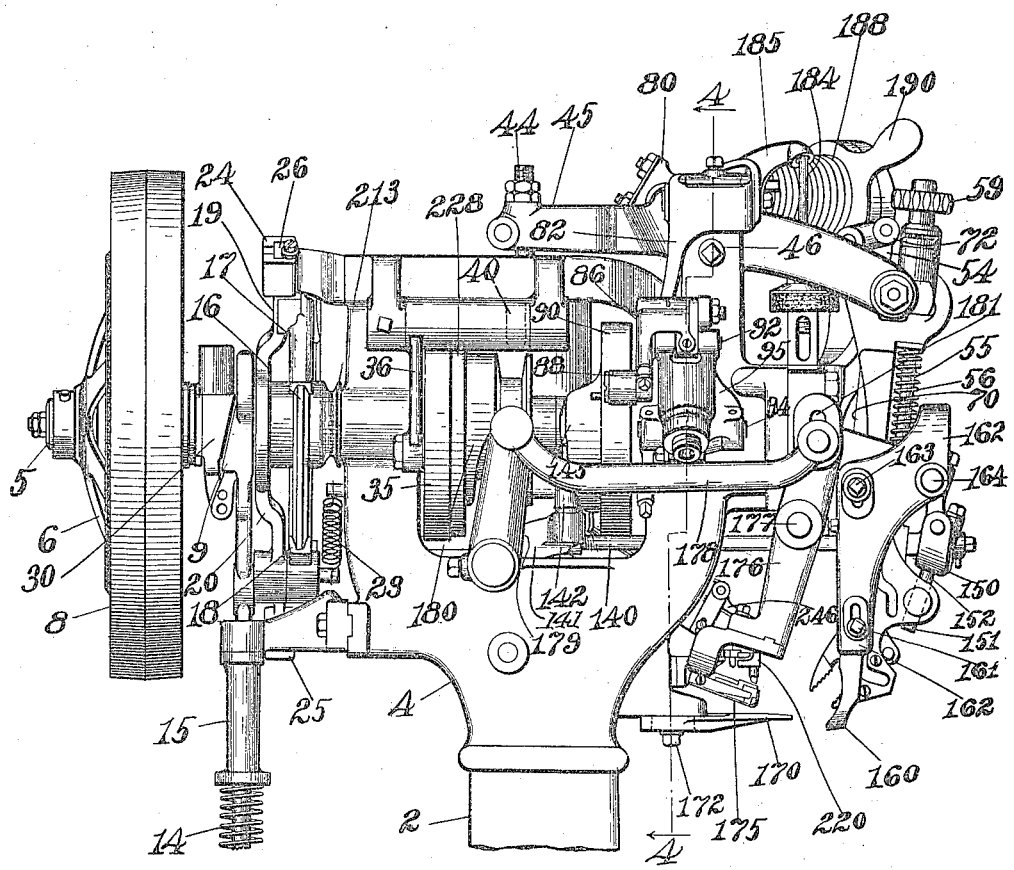
Figure 3:
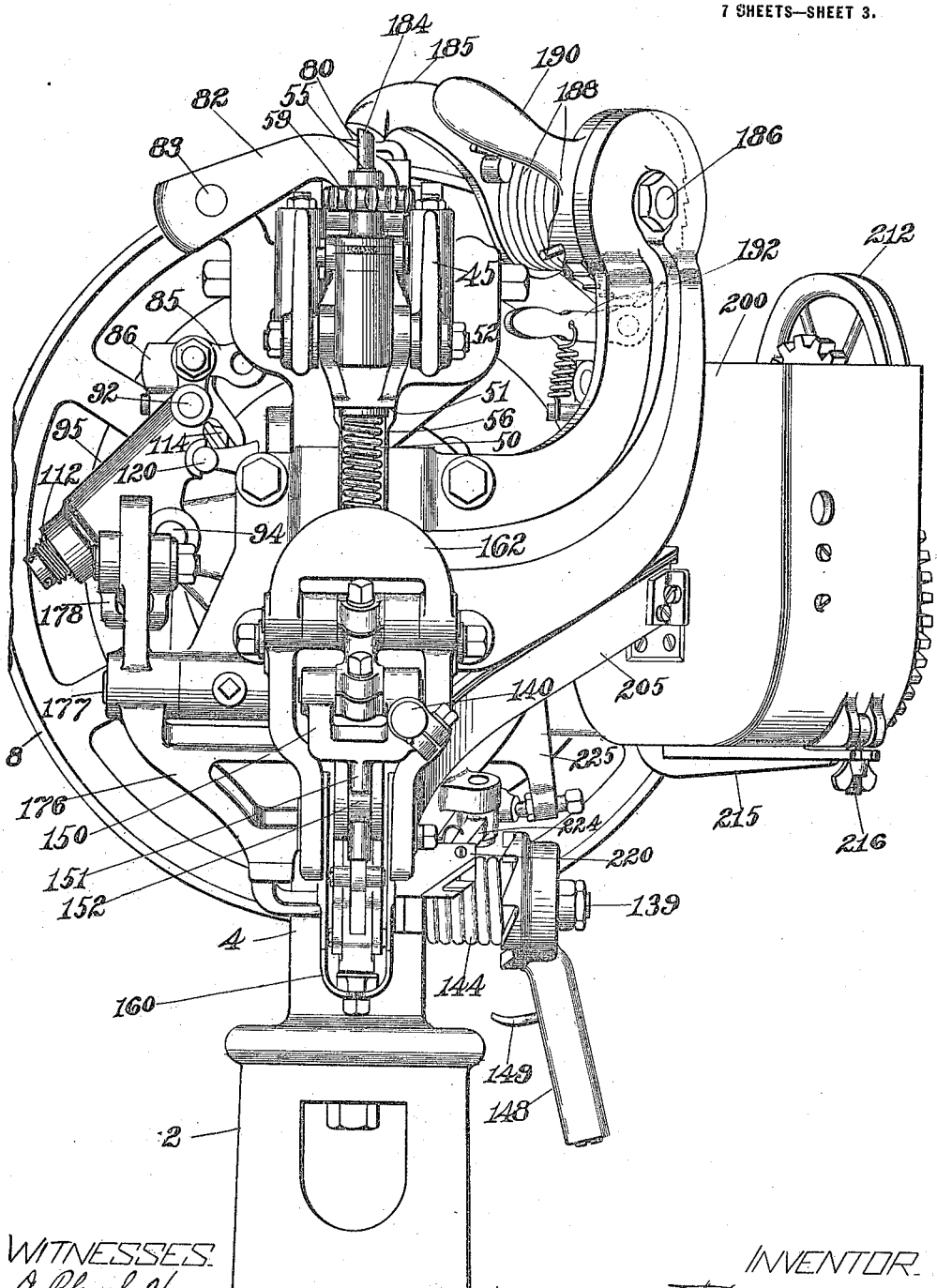
Figure 4:
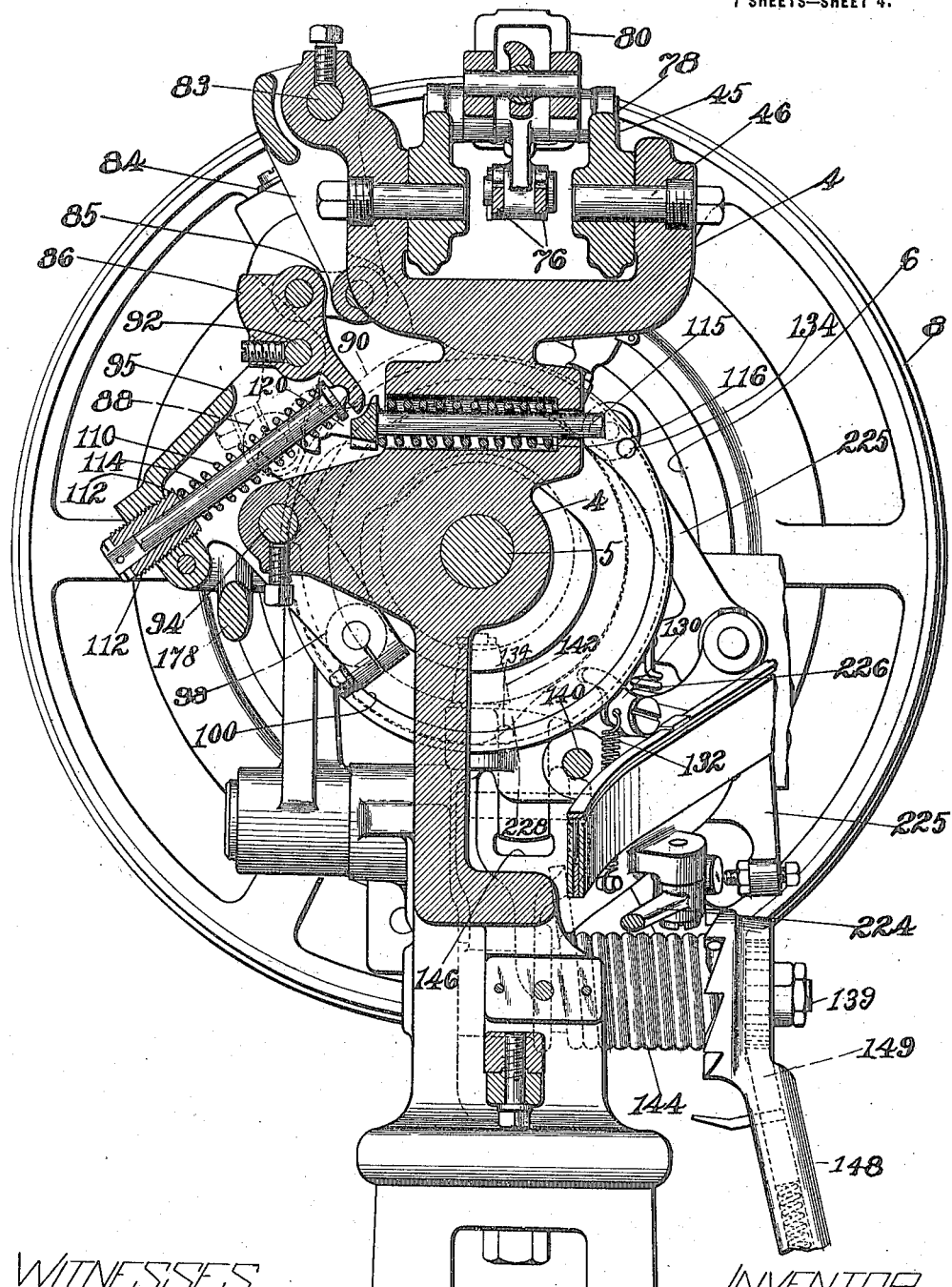
Figure 5:
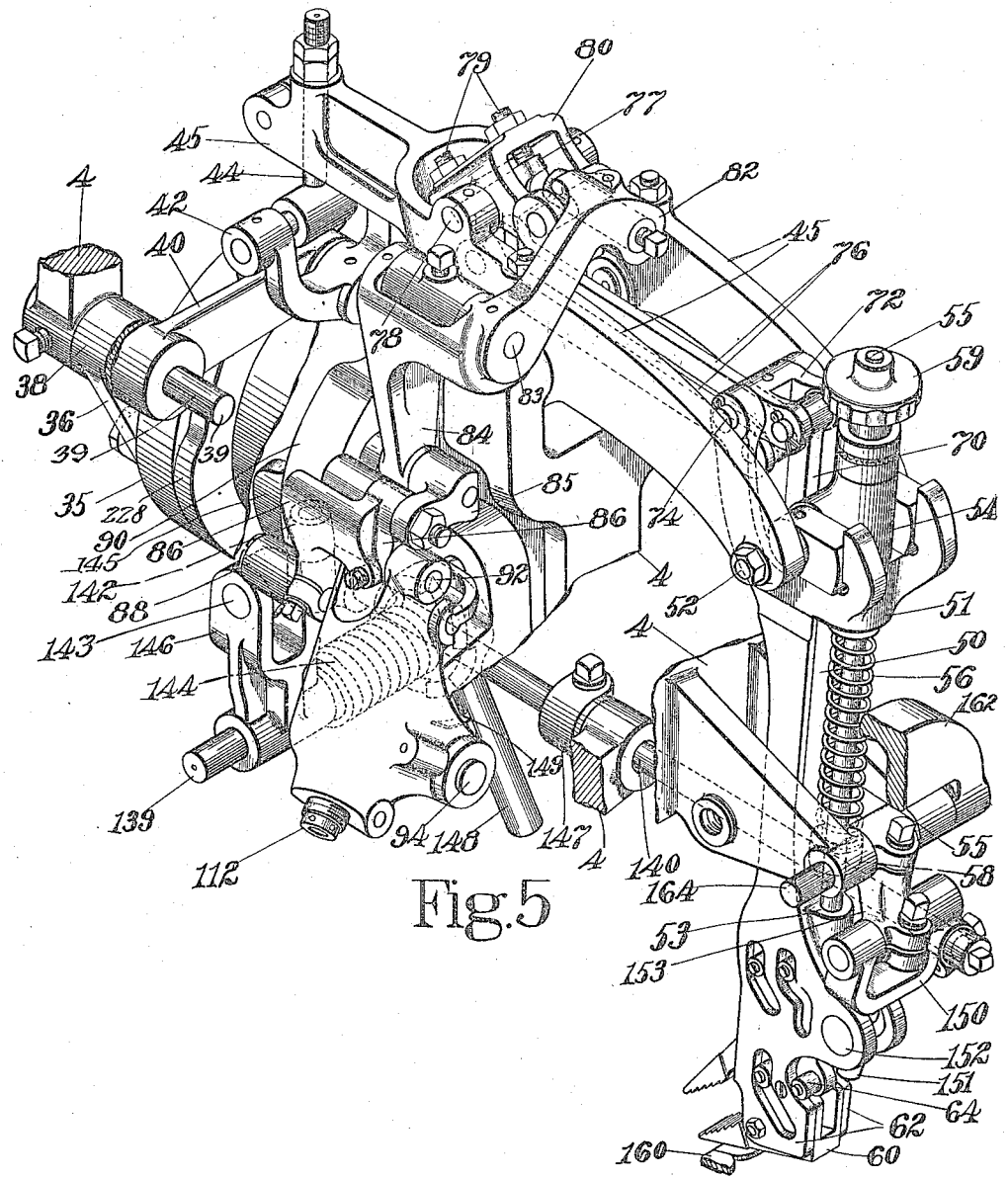

In the drawings: Figure 1 is an elevation of the right hand side of a machine embodying this invention in the best form now known to me; Fig. 2 is an elevation of the left hand side of the head of the machine; Fig. 3 is a front elevation of the head of the machine; Fig. 4 is a vertical transverse section on line 4—4 of Fig. 2; Fig. 5 is a perspective view of the gripper mechanism; Figs. 6, 7 and 8 are views of the mechanism for supplying, separating and delivering the tacks by which the upper pulled over the shoe bottom by the gripper is fastened; Fig. 9 is a view of the brake mechanism; Fig. 10 is a sectional detail taken on the line 10—10 of Fig. 9; Fig. 11 is a detail of part of the clutch mechanism in elevation.

The machine is built with a base 2 to stand on the floor and a column 3 upon which the head 4 is carried. In the head is mounted a single cam shaft 5 which is connected by a friction clutch 6 with a loose pulley 8 that is continuously driven. The clutch is closed by a wedge 9 on the head of a rod that is connected with a treadle 10 fulcrumed at 12 in the base 2 and a spring 14, acting against the lower end of a guide sleeve 15 depending from the head, withdraws the clutch when pressure on the treadle is relieved. On the cam shaft 5 is a brake disk 16, Figs. 1, 2 and 9, with the peripheral edge of which coöperate upper and lower shoes 17, 18, mounted respectively on arms 19, 20 of an endwise movable bar that is confined in guides 24, 25 and is slotted, Fig. 9 to embrace the shafts. A rockshaft 22 is journaled in the lower arm 20 of this bar, see Figs. 9 and 10, and has one arm connected with the stem of the clutch closing wedge 9 at 21 while the other arm directly carries the brake shoe 18. By this arrangement downward movement of the wedge 9 to allow the clutch to open is accompanied by turning of the rockshaft 22 in the direction to apply shoe 18 to brake disk 16. As soon as that shoe engages the brake disk it becomes a fulcrum or a fixed member with relation to which the rock-shaft 22 moves the bar 19, 20 downwardly to apply brake shoe 17. This application of the two brake shoes successively instead of simultaneously is further insured by a spring 23 extending from the rockshaft 22 to the head 4 and pulling the bar 19, 20 upwardly against stop 26 on guide 24. Successive application of the brake shoes has the advantage of stopping the cam shaft with a minimum of shock and this advantage is increased by applying the first one through the spring 23 as soon as the clutch wedge retraction begins. This is important in a highly organized machine like the present one which it is desirable to run at high speed.

The block 30, Fig. 11, having a wedge face to coöperate with wedge 9 is vertically movable and has a locking bolt 32 coöperating with seats 33 in a vertically stationary member 34 mounted loosely on the shaft 5. By this means the block 30 may be secured in its operative, full line position or may be secured in a position so high, see dotted lines, that treadle depression will not raise the wedge 9 high enough to close the clutch and start the machine. This affords insurance against damage from unintentional starting of the machine while making adjustments although leaving the treadle and brake shoes free to be moved.

The above described brake and stop mechanism is covered by a divisional application Serial No. 97,055, filed May 12, 1916.

The shaft 5 carries, Figs. 2 and 5, a cam block 35 having in its rear side a path for a roll on the arm 36 of a rock sleeve 38 turning on a fixed stud 39 and having a second arm 40 extending inwardly to the median portion of the machine and connected by a universal joint comprising a yoke 42, Fig. 5, and rod 44 to the rear end of the updraw lever 45 which is bifurcated as shown in Fig. 5 and from the front end of which the grippers are suspended. The updraw lever 45 is fulcrumed on studs 46, Figs. 2 and 4, between upwardly projecting ribs of the head 4.

The connection of the updraw lever 45 with the gripper casing 50 is indirect through the transverse pivot pin 52 to the sleeve 54 and the upright rod 55. The rod extends through a forward extension 51 of the casing and through the updraw spring 56 into a seat in the casing at 53. The rod carries a collar 58 by which it uplifts the gripper casing yieldingly through the spring, the tension of the spring being adjusted by a hand nut 59 threaded on its upper end. This provides a yielding actuation of the grippers from a positively actuated updraw lever having a constant stroke. The mechanism of the gripper may be substantially as in prior Patent No. 958,017, granted on my application May 17, 1910, or of any other appropriate construction.

In the form illustrated the lower gripper jaw 60 is formed with walls which extend upwardly between the sides 62 of the gripper frame and are secured to them. The side plates 62 are formed with slots or guiding surfaces which direct the movements of the mechanism for operating the upper jaw, and the upwardly extending walls of the lower jaw 60 are shaped to form portions of the guiding surfaces, as for example for the rolls 64.

The gripper is closed by force transmitted downwardly through a link 70 depending from the front arm of a rocker 72 turning on pin 74 supported on arms extending upwardly from the gripper casing 50, said rocker having its lower arm connected by links 76 to the lower rear arm of a rocker 80 fulcrumed at 78 in the updraw lever, Figs. 1 and 5. The rocker is preferably formed, for the purpose of providing adjustment, in two parts as shown in Fig. 5, the links 76 being connected directly to part 77 which is adjustable within part 80 about their common pivot 78 by means of stop screws 79. By shifting the stop screws the links 76, 70 can be moved relatively to the actuating mechanism which will be described to change the opening of the gripper jaws. The front end of rocker 80 is connected by a universal joint with the upper arm 82 of a rocker fulcrumed in head 4 at 83, Figs. 4 and 5, the lower arm 84 of which rocker is connected by a link 85 to the upper end of a lever 86, Figs. 2 and 5, which carries a roll 88 engaging the periphery of a cam block 90. The lever 86 is fulcrumed on a rod 92 that is carried at the upper end of a lever 95 which turns on a fulcrum rod 94 and has on its lower end a cam roll 98, Fig. 4, to engage a track 100 in the front face of cam block 90.

The lever 86 is actuated from the face of the cam 90 to tension and hold under tension the spring 110 which effects the final closing of the gripper while the lever 95 is actuated by the cam track 100 to effect the initial closing of the gripper, in which movement it carries the lever 86 with it bodily, the cam 90 being so designed that there is no relative movement between the lever 95 and the lever 86 and the spring 110 is held under the same degree of compression. When the gripper has nearly closed, however, the path of the cam 100 holds the lever 95 stationary while the cam 90 permits rotation of the lever 86 in response to the spring 110 to effect the final closing of the gripper. The final closing of the gripper is therefore rendered yielding through the spring 110 and the closing tension is substantially the same whatever may be the thickness of the stock between the gripper jaws. The spring 110 abuts at its lower end against a sleeve 112 which is threaded into the lever 95 for adjustment to vary the tension of the spring and which forms a guide for the end of a headed rod 114 which the spring encircles and against the head of which it bears. The head of the rod articulates with the lower arm of the lever 86 to which it transmits the tension of the spring 110.

To prevent lost motion and consequent rattling of the roll 98 in the cam path 100, it is desirable to hold the roll constantly against the inner face of the cam track which thereby constitutes in effect an edge cam. For this purpose the plunger 115 is provided which is actuated to the left, Fig. 4, by a spring 116 and carries at its left hand end a yoke 120 the arms of which rest in recesses formed in the lever 95 and located above its pivot.

The overdraw movement of the gripper is effected through a rod 140, Fig. 5, the rear end of which is threaded into a block 141, Fig. 2, which carries a roll 142 that is held in engagement with a cam face having a projection 145 on the rear side of the cam block 90, Fig. 2, by a spring 144, Figs. 3, 4 and 5, acting through a swinging arm 146, Figs. 4 and 5, which is pivoted at 143 to the block 141 on the rod 140. The spring 144 is coiled about the stud 139 on which the arm 146 turns with one end back of the arm and the other fastened in an adjusting crank 148 in the handle of which is a pawl 149, Figs. 1 and 4. A collar 147, Fig. 5, adjustable on the overdraw rod 140 and adapted to abut against a fixed rod-guide affords means for limiting the overdraw movement effected by the spring 144 independently of the cam 145 which retracts the rod and retensions the spring. At its front end the overdraw rod is clamped to a yoke 150 a depending arm 151 of which, Figs. 3 and 5, is confined in a pin 152, extending between two side plates of the gripper casing with play to allow the gripper to move up and down for the updrawing movements. The yoke is suspended from the frame by a link 153.

The bottom rest is composed of two members 160 which meet beneath the gripper and form substantially an open loop within which the gripper moves. The parts 160 are secured to a carrier 162 in vertically adjusted position by screws 161. The carrier is adjustable about a center 164, Fig. 2, to position the bottom rest different distances from the edge of the shoe and secured in adjusted position by screws 163. By this adjustment of the carrier the rest may be so positioned that the front end of the tack block on its forward movement will enter the loop of the rest and the tacks will be driven close to its inner edge. This adjustment may be found of special value in turn shoe work as it enables the rest to engage in the channel of the innersole and the tacks to be driven into the thickest portion of the between substance. The edge or back rest 170 is rigidly secured to the machine frame by a bolt 172 with provision for adjustment in and out to change the position of the shoe with relation to the tacker for locating the tacking line nearer to or farther from the edge of the shoe bottom.

The tack block 175 is mounted on the lower end of a lever 176 to advance from tack receiving position, Fig. 2, over the shoe bottom to upper securing position in an arc inclined downwardly and inwardly with relation to the shoe bottom and therefore delivers a downwardly and inwardly directed wiping blow to the stock which has been pulled by the gripper. The lever is fulcrumed at 177 and actuated through a link 178 from a track in cam block 180, the rear end of the link being sustained by a rocking support 179. The upper portion of the carrier lever 176 is provided with a slot 181 which is struck from the bearing of the opposite end of the link 178 as a center so that the forward end of the link 178 may be adjusted up and down in the slot 181 without affecting the tack receiving position of the tack block. As the link is adjusted in the slot 181, however, the stroke of the tack block, and hence its position relative to the work and to the gripper, will be varied. As the driver bar is carried by the tack block it will be in proper driving relation to the tack block whatever may be the limit of its movement into tack driving position as determined by the above described adjustment. The tack driver bar is jointed, the lower portion 182 being guided in the tack block lever 176, Fig. 1, while the upper section 184 is guided in the machine frame, being raised by a usual driver cam that is not detailed on these drawings against a spring arm 185, Fig. 3, that turns about a stud 186 that is encircled by the spring 188 the tension of which is set by a crank disk 190 having ratchet teeth on its lower edge that are engaged by a locking pawl 192. The tack supplying mechanism is arranged to deliver two tacks successively to the tack block 175 which has two tack pockets, there being two drivers 195, whereby two tacks are driven side by side at one time.

The tacks are supplied from a hopper 200, Figs. 1, 3 and 7, in which is journaled a lifter shaft 202, carrying means 204 for raising tacks and depositing them on the raceway 205 which has one tack channel, a clearer shaft 206, carrying devices 208 for removing misplaced tacks from the raceway channel, and a counter shaft 210 from which the lift and clearer shafts are driven at appropriate relative speeds by intermeshing gearing as shown in the drawings, the whole being driven by a pulley 212 and belt from a pulley 213 on the main shaft 5, Fig. 2. The raceway is supported on the hopper and extends through an appropriately shaped aperture in the side of the hopper. The hopper is provided with a door 215 hinged at 219, Fig. 1, and fastened by swinging bolt 216, which, when loosened, permits the door to swing downwardly for the removal of the tacks, when a change in kind of tacks being used is required or when for any other reason it is desirable to empty the tack block.

At the lower end of the raceway 205 it delivers tacks to the duplex separator block 220, Figs. 6, 7 and 8, in which an actuator bar 222 is reciprocated by a horizontal lever 224, the rear end of which is engaged by a vertical lever 225 bearing a roll on its upper end which is held by a spring 226 in engagement with an edge cam 228 having an intermediate partial rise between its lower portion and the high portion with which the lever is shown in engagement in Fig. 7. The cam actuates the bar 222 on the back stroke and a spring 227 effects the forward or tack separating stroke. A separator plate 230 is connected to the lower side of the bar 222 yieldingly through a spring plunger 232, the separator being guided in the block 220 as appears most clearly from the full lines in Fig. 6 and the dotted lines in Fig. 8 and having a vertical body portion extending across the lower end of the raceway channel, or the continuation thereof in the block 220. This vertical body portion of the separator plate has two notches or tack recesses 235, 236 the former of which stands in line with the lower end of the raceway channel as in Fig. 8 when the separator is at the right hand end of its stroke, thus allowing a tack to seat itself in recess 235 while the separator is at rest on the high part of cam 228. When the cam turns in the direction of the arrow to present the intermediate portion to lever 225, the springs 226 and 227 transmit movement through the spring 231 on the rod 232 to shift the separator 230 to the left, Fig. 8, to a point when the recess 236 is in front of the raceway channel in which position the separator remains at rest momentarily while a second tack descends into said recess. Further rotation of the cam 228 now permits movement of the separator to a position in which the recesses 235, 236 are opposite the tack throats 240, in which position there is a dwell. In this position the underlying portion of the slide 230, Fig. 6, which carries the rod 232, comes against the stationary stop 239, further movement of the separator being thus arrested while the slide 222 may continue to move by compressing the spring 231. In the rear edge of the actuator bar 222 there is a cam slot 242 which embraces a depending stud 243 on a slide 244 that is movable forwardly and backwardly in the block 220. In this slide there is a plunger 245 actuated forwardly by a spring 241 and having on the front face of its head ejecting fingers 247 that are shaped and arranged for movement through recesses 235, 236 to force the two tacks therefrom into the tack throat 240. When the separator has completed its stroke, the spring 231 is compressed by further movement of the bar 222 and the inclined part of the cam slot 242 therein acts on the pin 243 to push the plunger 245 and fingers 247 forward to expel the tacks from the separator into the throats 240.

When the face of the plunger 245 comes against the abutting face of the block 220, Fig. 6, the fingers 247 have passed through the recesses 235, 236 into position to complete the periphery of the tack throats 240 and the spring 241 thereafter yields and permits the ejecting plate 221 to be further actuated by the slot 242 in the bar 222 against the heads of the tacks to push them into the tack throat 240 through which they pass to the tack block 175.

To prevent the tacks from sticking in the raceway and refusing to pass into the recesses 235, 236 of the separator, a knocker 130, Fig. 4, is provided which comprises a lever pivoted to the frame of the machine and having one arm thereof normally held by a spring 132 against a projection located, preferably, upon the rear wall of the raceway and having the other arm extending into the path of pins 134 carried by the cam block 90. A pin 134 is so located that it raises the left-hand end of the lever 130 against the spring 132 and releases it at the time when a tack is about to pass into the recess 235, the opposite end of the lever striking the projection on the raceway and jarring it to assist the passage of the tack into the separator. Another pin 134 is so positioned as to operate the lever 130 again when the recess 236 is opposite the raceway.

The protective cover 256 for the separating devices is hinged above them on a rod 257 which has a knurled head by which it may be pulled longitudinally against the spring 259 and turned up and down to raise and lower the cover 256. A spring 258 engages a shoulder on the cover to hold it down. To turn the cover up the knurled head is pulled to the right against the spring 259 until the spring 258 is disengaged from the shoulder on the cover when it may be turned up by rotation of the knurled head. When the cover is turned down the shoulder snaps into locking engagement with the spring 258.

The novel tacking mechanism above described but not claimed herein is covered by a divisional application Serial No. 806,315, filed December 12, 1913.

In the use of the machine, which is primarily intended for side lasting, the shoe is often found to be in a condition in which a hand drafting of the upper into the shank is desirable. For this purpose a bottom abutment 260 is fastened to the machine column adjacent to a fixed depending gripper jaw 262 and a pivoted jaw 264 which is connected to a treadle 265. The portion of the upper to be pulled is inserted between the jaws and the treadle depressed, after which the shoe is rocked or first turned, as may be found desirable, in contact with the abutment 260 to effect the desired straining of the upper. Preferably the abutment 260 is pivoted at 261 so that its position relatively to the fixed gripper jaw 262 may be varied at the will of the operator.

Having thus described the invention, what is claimed as new and desired to be secured by Letters Patent of the United States is:—

1. A lasting machine having, in combination, a gripper, and means for operating the gripper to overdraw the upper, comprising an overdraw rod connected to the gripper, a block attached to the rod, a cam, a roll on the block and engaging the cam, a swinging arm connected to the roll carrying block, an operating spring one end of which engages said arm, and a manual tension adjusting lever engaging the other end of the spring.

2. A lasting machine having, in combination, a gripper, and means for operating the gripper to overdraw the upper comprising an overdraw rod, a yoke to which the front end of the rod is clamped and which has a depending arm, and a pin confined in the gripper and into which the arm extends to force the gripper forwardly and backwardly with freedom for the gripper to move vertically relatively to the arm, and means to operate the rod.

3. A lasting machine having, in combination, a gripper, and means for operating the gripper to overdraw the upper comprising an overdraw rod located at one lateral side of the median plane of the machine and the gripper, a block extending laterally from the rear end of the rod and carrying a cam roll in said median plane, a yoke to one lateral side of which the front end of the rod is connected and which has an arm operatively connected with the gripper in said plane, and a cam to engage the cam roll.

4. In a machine of the class described, the combination with operating mechanism of a gripper comprising an upper jaw, plates spaced apart and provided with guiding surfaces for directing the movements of the upper jaw, and a lower jaw secured between the plates and having walls extending upwardly between the plates and forming portions of the guiding surfaces.

5. In a machine of the class described, the combination with a gripper, of means for operating the gripper to tension the work, a work rest comprising members extending downwardly upon opposite sides of the gripper closely adjacent thereto and inturned toward each other beneath the gripper to form a work engaging foot adapted to contact with the innersole inside the margin of the upper.

6. A lasting machine having, in combination, a tacker constructed and arranged to insert a plurality of tacks simultaneously into the work, a gripper having overdraw movements, and a shoe rest through which the gripper moves in its overdraw movements and having a flat work engaging face adapted to contact with the shoe bottom inside the margin of the upper to level the shoe for the operation of the tacker.

7. A lasting machine having, in combination, a gripper, a shoe bottom rest, a carrier for the rest constructed and arranged for angular adjustment about a pivot sufficiently above the shoe to render the forward and backward adjustment of the rest substantially horizontal, and means whereby vertical adjustment of the rest may be effected.

8. A lasting machine having, in combination, a gripper, a shoe bottom rest, and a carrier in which the rest is adjustable vertically and which is adjustable angularly to position the shoe engaging portion of the rest toward or from the body of the machine.

9. In a machine of the class described, the combination with a gripper, and means for operating the gripper to tension the work, of a work rest comprising vertically adjustable members upon each side of the gripper, a carrier for the work rest pivoted to the machine frame at a point above and forwardly of the gripper, said carrier being constructed and arranged for movement about the pivot to effect forward and backward adjustment of the work rest.

10. A machine of the class described having, in combination, a lasting gripper having updraw and overdraw movements, a tack block, means for moving the tack block from a rearward, raised, tack receiving position to a forward, depressed, work engaging position whereby a downward and outward blow is given to the stock which has been updrawn and overdrawn by the gripper, means for supplying the tack block with tacks, and means for driving the tacks when the tack block reaches work engaging position.

11. A lasting machine having, in combination, a gripper having overdrawing movements, a tacker which inserts two tacks one of which is located on each lateral side of the gripper, and a shoe rest having a broad foot extending across the plane of the overdrawing movement of the gripper and in the direction of the tacking line and coöperating with the gripper in leveling the shoe bottom to a position in which the two tacks will be driven equally into the shoe bottom.

12. A lasting machine having, in combination, a gripper, a tack block, a wiper, and a lever having a broad end upon which the block is mounted and means to swing the lever from an inclined position in which the block receives tacks into a substantially upright position to cause the wiper to pass over the stock and present a tack in position to be driven into it.

13. A lasting machine having, in combination, grippers, a tack block, and means for imparting to the tack block a movement from tack receiving position in an arc inclined downwardly and inwardly over the work into tack delivering position.

14. A lasting machine having, in combination, a tack block movable forwardly and backwardly over the shoe edge, a gripper, and a rest in the form of a loop through which the gripper acts and into which the end of the tack block enters on its forward movement so that the tacks are driven adjacent to the inner edge of the rest.

In testimony whereof I have signed my name to this specification in the presence of two subscribing witnesses.

THOMAS H. SEELY.

Witnesses:
 NORMAN C. HUSSEY,
 ELMER B. GRUSH.

Copies of this patent may be obtained for five cents each, by addressing the "Commissioner of Patents, Washington, D. C."